April 9, 1935.                    C. W. KUEHNE                    1,996,769
             PROCESS FOR THE MANUFACTURE OF STABLE SODIUM
                     HYPOCHLORITE AND PRODUCT THEREOF
                            Filed June 1, 1932
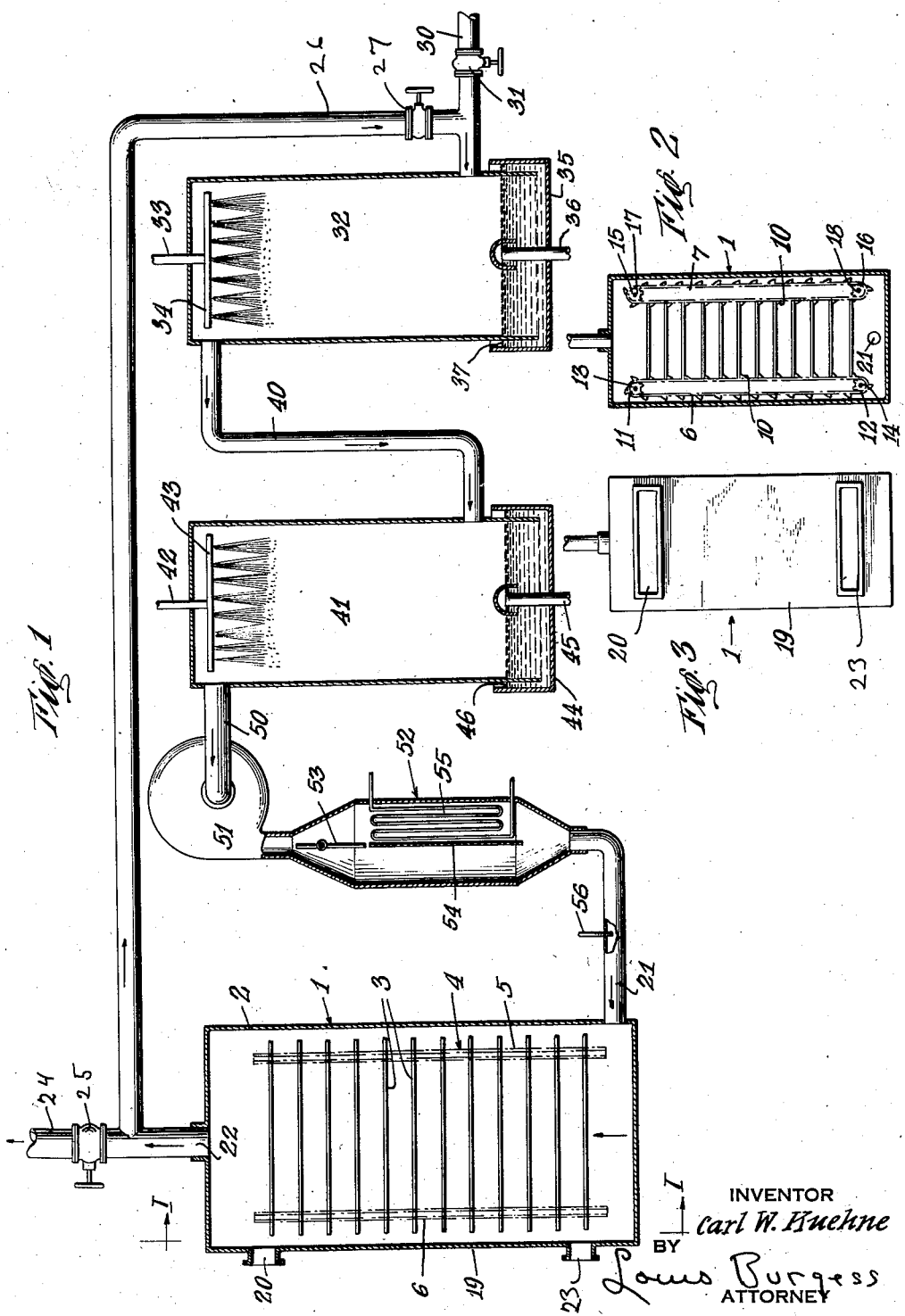
INVENTOR
Carl W. Kuehne
BY
Louis Burgess
ATTORNEY Patented Apr. 9, 1935

1,996,769

UNITED STATES PATENT OFFICE 1,996,769

PROCESS FOR THE MANUFACTURE OF STABLE SODIUM HYPOCHLORITE AND PRODUCT THEREOF

Carl W. Kuehne, Elizabeth, N. J.

Application June 1, 1932, Serial No. 614,725

7 Claims. (Cl. 23—86)

The invention will be fully understood from the following description read in conjunction with the drawing, in which, Fig. 1 is a vertical section through apparatus in which my process may be carried into effect.

Fig. 2 is a vertical section through the construction shown in Fig. 1, on the plane indicated by I—I, and Fig. 3 is a front view of a part of the construction shown in Fig. 1.

Referring to the drawing, the apparatus comprises the tray drier 1 consisting of the tower 2, preferably of rectangular cross-section, and containing a plurality of trays 3. Each of the trays is adapted to hold a quantity of the material to be dried, and to facilitate drying is preferably provided with a perforated bottom. The trays may with advantage be fabricated of a corrosion resisting alloy, such as stainless steel. The trays are held in the relative positions in the tower 1 by means of a vertical conveyor 4. This conveyor consists of four endless chains, of which 5 and 6 are shown in the side view occurring in Fig. 1 and 7 is additionally shown in the sectional view occurring in Fig. 2. The chains carry dogs or projections 10 which engage the trays. Chain 6 runs on the sprockets 11 and 12 carried respectively by the shafts 13 and 14, and the chain 7 runs on the sprockets 15 and 16 carried by the shafts 17 and 18. The shafts are journalled in suitable bearings not shown, and at least one of the shafts on either side projects through the side wall 19 of the tower 1 so that the conveyor may be manipulated from the exterior of the tower. The construction of the two endless chains at the rear of tower 1 is substantially identical with that of the chains 6 and 7, and need not therefore be more fully described.

A tray loaded with sodium hypochlorite to be dried is inserted in position in the tower 1 through the manhole 20, the conveyor lowered, and a second tray inserted through manhole 20 until all of the trays have been inserted. The manholes are covered and the drying operation is then commenced; the gas used for drying is introduced through inlet 21 and passes upwardly through the apparatus in contact with the sodium hypochlorite carried by the trays 3, and thereafter escapes from the tower 1 through the outlet 22. The gas utilized for drying the sodium hypochlorite must be inert in relation to this material; and where it originally contains carbon dioxide or volatile acids of any character, is carefully freed of the same prior to use as a drying medium.

The drying medium ordinarily employed is air, and for this purpose air is taken in through the inlet 30 controlled by the valve 31, and is passed upwardly through the tower 32. In the tower 32 it passes in counter-current contact with a spray of a cooling liquid supplied through the pipe 33 to distributor 34 by which the liquid is sprayed into tower 32. Considerable drying of ordinary atmospheric air may be effected in tower 32 by the use of cold water, say for example at temperatures below 15° C., and this in addition functions to remove a part of the carbon dioxide content of the air. The water, after descending the tower, accumulates in the base 35 of the same, from which it is continuously withdrawn through overflow pipe 36. Water seal 37 prevents the escape of the air from the base of the tower. After passing upwardly through the tower 32, the partially dried air passes through duct 40 into the tower 41. In this tower the air passes upwardly and in counter-current contact with a medium adapted to further dry the same and to completely remove the carbon dioxide content.

I have found that this effect may be conveniently accomplished by the use of a solution of alkali metal hydroxide, cf. sodium hydroxide, at relatively low temperatures, and for this purpose I introduce to tower 41, through pipe 42, communicating with the distributor 43, a solution of sodium hydroxide at a temperature of about −10° C. It will of course be understood that the solution must be of a concentration which is entirely fluid at the temperature mentioned. The drying and removal of carbon dioxide may of course be accomplished in any suitable manner, as for example by contact, preferably counter-current, with solid caustic (lump or flake) or with soda lime, or with any equivalent reagent. Alternatively, the drying and removal of carbon dioxide may be accomplished in separate stages, as for example by refrigeration followed or preceded by contact with a base adapted to combine with the carbon dioxide. The air passes upward through the tower in counter-current contact with the descending spray of caustic solution. The solution accumulating in base 44 of tower 41 is continuously withdrawn through overflow pipe 45. It will ordinarily be fortified and again refrigerated to a temperature of about −10° C., and thereafter recirculated through tower 41. Liquid seal 46 prevents the escape of air from the base of tower 41. The air issuing from the tower 41 through the pipe 50 has been completely dried and freed of its carbon dioxide content. The air as it issues from the tower 41 is substantially at the low temperature of the caustic solution, and before use in drying the sodium hypochlorite is preferably elevated to a temperature of about 18° C. This temperature should, in any event, be below the melting point of the crystals of sodium hypochlorite to be dried. This air is supplied by means of centrifugal fan 51 to the heater 52. In the heater 52 the air may be diverted by means of the damper 53 to pass either through the open section 54 or over the heater coils 55 which are supplied with any suitable heating medium, cf. steam. By manipulation of the damper 53, I can so distribute the air in the heater as to obtain any desired temperature. A suitable temperature measuring device 56 is provided in the pipe 21 to measure the temperature of the air passing therethrough.

Whenever the tray carrying sodium hypochlorite in the lower part of tower 1 is dried to the desired point, the tray is removed through the manhole 23. The remaining trays are then moved down by operation of the vertical conveyor, and a new tray loaded with sodium hypochlorite crystals is introduced through the manhole 20. The manholes are closed and the drying operation continued. The air passing from the top of the tray drier 1 may either be discharged into the atmosphere through pipe 24 controlled by valve 25, or may be reintroduced to tower 32 and recirculated in whole or in part through pipe 26 controlled by the valve 27. The recirculated air is substantially free of carbon dioxide, and it is therefore advantageous to employ recirculation where the moisture content of the same as it issues from the tray drier is not excessive.

The sodium hypochlorite supplied to the drier 1 through the manhole 20 is ordinarily sodium hypochlorite tetrahydrate which may be made in any suitable way, as for example by the treatment of concentrated solutions of sodium hydroxide with chlorine. The drying is not however carried to completion, but partially dried sodium hypochlorite is removed through the manhole 23 whenever the dehydration has progressed to the point of forming a material containing from two to three molecules of water (both limits inclusive) for each molecule of sodium hypochlorite present. I have found that by removing the water to this extent the process is operable with the maximum efficiency and the product is almost completely stable in storage or shipment.

The foregoing description is given by way of illustration and not of limitation, and it is therefore my intention that the invention be limited only by the appended claims or their equivalents, in which I have endeavored to claim broadly all inherent novelty.

I claim:

1. Process of making stable sodium hypochlorite, which comprises forming a body of crystals of sodium hypochlorite tetrahydrate, passing a dry gas inert in relation to sodium hypochlorite through the body of crystals while maintaining the temperature below the melting point of the said crystals, and continuing the passage of gas until the water contents of the sodium hypochlorite corresponds to not less than 2 nor more than 3 molecules of water for each molecule of sodium hypochlorite present.

2. Process of making solid stable sodium hypochlorite, which comprises forming a body of crystals of sodium hypochlorite tetrahydrate, passing air through a carbon dioxide absorbing reagent under conditions adapted to substantially completely remove carbon dioxide therefrom, and then passing the carbon dioxide free air through the said body of crystals.

3. Process of making solid stable sodium hypochlorite, which comprises forming a body of crystals of sodium hypochlorite tetrahydrate, passing air through a carbon dioxide absorbing reagent under conditions adapted to substantially completely remove carbon dioxide therefrom, then passing the said air through the body of crystals while maintaining the temperature below the melting point of the said crystals, and continuing the passage of air through the said mass until the water content corresponds to not less than 2 nor more than 3 molecules of water for each molecule of sodium hypochlorite present.

4. Process of making solid stable sodium hypochlorite, which comprises forming a body of crystals of sodium hypochlorite tetrahydrate, forcing a gas inert in relation to sodium hypochlorite through the said body while maintaining the temperature below the melting point of the said crystals, conducting away the said gas, and dehydrating and recirculating at least a part of the same.

5. Process of making solid stable sodium hypochlorite, which comprises forming a body of crystals of sodium hypochlorite tetrahydrate, dehydrating air, passing the air through a carbon dioxide absorbing reagent under conditions adapted to the substantially complete removal of carbon dioxide therefrom, then passing the air through the said body of crystals while maintaining the temperature below the melting point of the said crystals, and continuing the passage until the water content corresponds to not less than 2 nor more than 3 molecules of water for each molecule of sodium hypochlorite present.

6. An article of manufacture, consisting of a solid stable crystalline sodium hypochlorite containing from 2 to 3 molecules of water for each molecule of sodium hypochlorite.

7. Process of making solid stable sodium hypochlorite, which comprises forming a body of crystals of sodium hypochlorite tetrahydrate, dehydrating air, passing the air through a carbon dioxide absorbing reagent under conditions adapted to the substantially complete removal of carbon dioxide therefrom, then passing the air through the said body while maintaining the temperature below the melting point of the said crystals, continuing the passage of air until the water content corresponds to not less than 2 nor more than 3 molecules of water for each molecule of sodium hypochlorite present, conducting away the said air after passage through the said body of crystals, dehydrating and recirculating at least a part of the same.

CARL W. KUEHNE.